Aug. 27, 1929.　　G. O. SHEFSTEAD　　1,726,244
PIPE SUPPORT
Filed Aug. 14, 1925
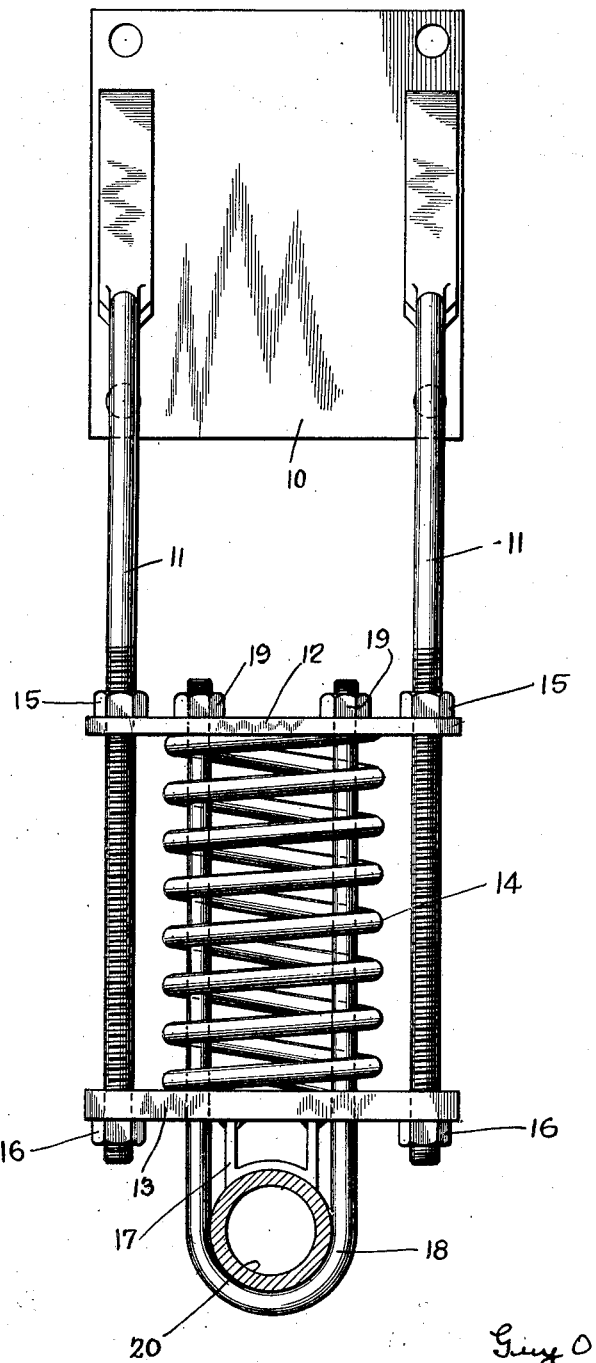
Inventor
Guy O. Shefstead
By his Attorney
R. J. Dearborn Patented Aug. 27, 1929.

1,726,244

UNITED STATES PATENT OFFICE.

GUY O. SHEFSTEAD, OF CASPER, WYOMING, ASSIGNOR, BY MESNE ASSIGNMENTS, TO THE TEXAS COMPANY, OF NEW YORK, N. Y., A CORPORATION OF DELAWARE.

PIPE SUPPORT.

Application filed August 14, 1925. Serial No. 50,196.

This invention relates to pipe supports and more particularly to hangers for yieldingly supporting pipes and for absorbing the vibration or pulsation in pipe lines.

One of the objects of the invention is to provide a support or hanger for pipes and pipe lines, so constructed and arranged as to yieldingly support a pipe and permit expansion and contraction of the pipe without buckling.

Another object of the invention is to provide a pipe support which will absorb the vibration or pulsation in pipe lines through which fluid is being pumped.

Other objects, features and advantages of the invention will appear in the following detailed description thereof.

In the drawing there is illustrated a pipe support or hanger constituting a preferred embodiment of my invention.

Referring to the drawing, 10 represents a bracket which can be suitably secured to a wall, rafter or other place where it is desired to mount the pipe support. A pair of spaced rods 11 are firmly secured at one end to the bracket 10, as by welding or the like. The rods are threaded throughout a portion of their lengths.

A pair of metal plates 12 and 13 are slidably mounted upon the rods 11 and a compression spring 14 is interposed between them, constantly tending to force the plates apart. Nuts 16 are screwed onto the ends of the rods 11 and serve as stops maintaining the plate 13 in position. The desired compression of the spring 14 is obtained by means of nuts 15 on the rods 11, the nuts also limiting the movement of the plate 12 in one direction. Thus the distance between the plates 12 and 13 and the compression on the spring 14 is adjustable by means of the nuts 15 and 16.

A strap iron pipe rest 17, formed with an arcuate section adapted to conform generally to the exterior contour of a pipe, is secured to the outer face of the plate 13 and constitutes a portion of the pipe support.

An elongated U-bolt 18· has its ends extended through suitable holes in the plates 13 and 12, and nuts 19 are screwed on the two ends of the bolt to adjust and hold it in operative position with respect to the plate 12. The U-shaped portion of the bolt, together with the rest 17, form the complete support for a pipe 20.

With the pipe hanger mounted in position the pipe to be supported is positioned between the U-shaped portion of the bolt 18 and the pipe rest 17. The compression spring 14 exerts a constant pressure against the plate 12 upon which the bolt 18 is mounted and consequently the U-shaped portion of the bolt is constantly forced towards the pipe rest 17 and yieldingly clamps the pipe 20 against the rest 17. If the pipe vibrates or pulsates the bolt 18 will yield sufficiently to relieve the strain on the pipe line, but the tendency is to constantly grip the pipe between the bolt and the rest, the compression on the spring 18 being adjusted so as to accomplish this result. Furthermore, while the pipe is well supported it is not so rigidly held in position that it cannot move longitudinally as expansion and contraction, due to heat changes, occur.

A pipe support of preferred form and construction has been illustrated and described for the purpose of showing a way in which this invention may be practiced, but the inventive thought upon which this invention is based is broader than the illustrative embodiment thereof and I, therefore, intend no limitations other than those imposed by the appended claim.

What I claim is:

A spring pipe support comprising a pair of spaced rods, a pair of spaced plates slidably mounted on said rods, a compression spring disposed between said plates, means for limiting the outward movement of said plates on said rods and for adjusting the compression on said spring, a pipe rest on one of the plates, and means cooperating with the other plate for yieldingly holding a pipe against the pipe rest.

In witness whereof I have hereunto set my hand and seal this 3rd day of August, 1925.

GUY O. SHEFSTEAD.